United States Patent
Schäfer-Sindlinger et al.

(10) Patent No.: US 7,005,116 B2
(45) Date of Patent: *Feb. 28, 2006

(54) PROCESS FOR REDUCING NITROGEN OXIDES

(75) Inventors: Adolf Schäfer-Sindlinger, Frankfurt (DE); Marcus Pfeifer, Solingen (DE); Paul Spurk, Bad König (DE); Yvonne Demel, Frankfurt (DE); Thomas Kreuzer, Karben (DE); Egbert Lox, Hanau (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/037,551

(22) Filed: Jan. 18, 2005

(65) Prior Publication Data

US 2005/0196333 A1 Sep. 8, 2005

Related U.S. Application Data

(63) Continuation of application No. 09/838,119, filed on Apr. 20, 2001, now Pat. No. 6,843,971.

(30) Foreign Application Priority Data

Apr. 22, 2000 (DE) ................................ 100 20 100

(51) Int. Cl.
*C01B 21/20* (2006.01)
(52) U.S. Cl. .................................. 423/239.2; 423/239.1
(58) Field of Classification Search ............ 423/239.2, 423/213.2, 213.5, 213.7, 237, 239.1; 502/74, 502/77, 79
See application file for complete search history.

(56) References Cited

U.S. PATENT DOCUMENTS

| | | | |
|---|---|---|---|
| 4,778,665 A | 10/1988 | Krishnamurthy et al. | |
| 4,961,917 A | 10/1990 | Byrne | |
| 5,116,586 A | 5/1992 | Baacke et al. | |
| 5,451,387 A | 9/1995 | Farnos et al. | |
| 5,482,692 A | 1/1996 | Audeh et al. | |
| 5,711,147 A | 1/1998 | Vogtlin et al. | |
| 6,843,971 B1 * | 1/2005 | Schafer-Sindlinger et al. ....................... | 423/239.2 |

FOREIGN PATENT DOCUMENTS

| | | |
|---|---|---|
| EP | 0 283 913 A2 | 9/1988 |
| EP | 198 20 682 A1 | 11/1998 |
| EP | 0 955 080 A1 | 11/1999 |
| WO | WO 90/13362 | 11/1990 |
| WO | WO 96/01689 | 1/1996 |
| WO | WO 99/39809 | 8/1999 |

OTHER PUBLICATIONS

H. Mishima et al: "Selective catalytic reduction on NO with NH3 over natural zeolites and its application to stationary diesel engine exhaust"; Appl. Cat. B. Environmental 19 (1998) pp. 119-125, no month.
S. Kasaoka et al: "Effect of Inlet NO/NO2 Molar Ratio and Contribution of Oxygen in the Catalytic Reduction of Nitrogen Oxides with Ammonia"; Nippon Kagaku Kaishi, (1978) No. 6, pp. 874-881, no month.
J.G.M. Brandin et al: "Catalytic Reduction of Nitrogen Oxides on Moredenite—Some Aspect on the Mechanism"; Catalysis Today, (1989) No. 4; pp. 187-203, no month.
A. Kato et al: "Reaction between Nox and NH3 on Iron Oxide-Titanium Oxide Catalyst", J. Phys. Chem. (1981) No. 85, pp. 4099-4102, no month.
T. Seiyama et al: "Catalystic Activity of Transition Metal Ion exchanged Y Zeolites in the Reduction of Nitric Oxide with Ammonia"; Journal of Catalysis, (1977) No. 48, pp. 1-7, no month.
G. Centi et al: "Role of the Nature of Copper Sites in the Activity of Copper-based Catalysts for NO Conversion", Res. Chem. Intermed. No. 17 (1992), pp. 125-135, no month.
J. Gieshoff et al., SAE 2000-01-0189: Improved SCR Systems for Heavy Duty Applications, presented at SAE 2000 World Congress, Detroit, Michigan Mar. 6-9, 2000.
*European Search Report for counterpart application No. EP 01 10 8785, dated Jul. 5, 2001.

* cited by examiner

Primary Examiner—Edward M. Johnson
(74) Attorney, Agent, or Firm—Kalow & Springut LLP

(57) ABSTRACT

A process for reducing the nitrogen oxides present in a lean exhaust gas from an internal combustion engine by selective catalytic reduction on a reduction catalyst using ammonia, wherein a fraction of the nitrogen monoxide present in the exhaust gas is oxidized to nitrogen dioxide before the exhaust gas, together with ammonia, is passed over the reduction catalyst. The reduction catalyst contains a zeolite exchanged with transition metals and oxidation of the nitrogen monoxide is performed in such a way that the exhaust gas contains 30 to 70 vol. % of nitrogen dioxide before contact with the reduction catalyst.

10 Claims, 7 Drawing Sheets

PROCESS FOR REDUCING NITROGEN OXIDES

This application is a continuation of U.S. patent application Ser. No. 09/838,119 filed Apr. 20, 2001, now U.S. Pat. No. 6,843,971, the entire disclosure of this application is hereby incorporated herein by reference.

INTRODUCTION AND BACKGROUND

The present invention relates to a process for reducing the nitrogen oxides present in a lean exhaust gas produced from an internal combustion engine by selective catalytic reduction on a reduction catalyst using ammonia, wherein a fraction of the nitrogen monoxide present in the exhaust gas is oxidized to nitrogen dioxide before the exhaust gas, together with ammonia, is passed over the reduction catalyst.

The process of selective catalytic reduction (SCR=selective catalytic reduction) has been used for a long time in the power station sector to reduce the nitrogen oxides present in the flue gases from a power station. The flue gases from power stations have a net oxidizing effect due to the high proportion of oxygen. The nitrogen oxides present therein can therefore be reduced to nitrogen only with difficulty. This problem was solved by so-called selective catalytic reduction, in which the flue gas is mixed with ammonia and passed over a suitable reduction catalyst at temperatures between 300 and 550° C. The reduction catalysts used are, apart from vanadium and tungsten oxide-containing titanium dioxide catalysts, also ion-exchanged zeolites such as, for example, ZSM-5, mordenite and faujasite. Reduction catalysts which are suitable for selective catalytic reduction are also called SCR catalysts in the following.

Attempts have been made over the last few years also to use selective catalytic reduction for removing nitrogen oxides from the exhaust gases from diesel engines and lean operated gasoline engines. These exhaust gases also contain a high proportion, up to 15 vol. %, of oxygen. About 60 to 95 vol. % of the nitrogen oxides present therein consists of nitrogen monoxide, depending on the operating status of the engine.

Known SCR-catalysts have the disadvantage that their catalytic activity is not high enough for the high space velocities prevailing in the case of car exhaust gas treatment and is subject to rapid ageing. In the case of catalysts containing vanadium oxide, there is a clear loss in activity at temperatures higher than 700° C.

According to DE 198 20 682 A1, it is disclosed that the concentration of nitrogen dioxide in the exhaust gas can be initially raised to 50 vol. % in order to improve the reduction of nitrogen oxides in lean exhaust gases from internal combustion engines. This takes place, according to the cited published application, by oxidizing nitrogen monoxide to nitrogen dioxide in a electrical gas discharge. The exhaust gas treated in this way is then passed over a SCR catalyst while supplying a reducing agent, preferably ammonia. Suitable SCR catalysts which are mentioned are catalysts from the power station denitrogenation sector and also ZSM-5 zeolites exchanged with copper cations.

Also, according to U.S. Pat. No. 5,891,409, it is known that many reduction catalysts have a higher activity for the reduction of nitrogen dioxide than for nitrogen monoxide. Therefore, U.S. Pat. No. 5,891,409 proposes first oxidizing the nitrogen monoxide present in the lean exhaust gas from an internal combustion engine to nitrogen dioxide on an oxidation catalyst and then converting the nitrogen dioxide formed to nitrogen, carbon dioxide and water on a SCR catalyst with the addition of hydrocarbons as a reducing agent. A catalyst consisting of γ-aluminum oxide is mentioned as a preferred reduction catalyst.

WO 99/39809 describes a system for reducing the amount of nitrogen oxides in internal combustion engine exhaust gases, in particular from diesel engines, which consists of an oxidation catalyst which converts at least some of the nitrogen monoxide to nitrogen dioxide, a particle filter, a source of a reducing agent such as ammonia and a SCR catalyst. Using this system, the conversion of nitrogen oxides can clearly be improved. A SCR catalyst based on a $V_2O_5/WO_3/TiO_2$ catalyst is preferably used.

One problem associated with the $V_2O_5/WO_3/TiO_2$ catalysts usually used in the power station sector is the possible emission of volatile, toxic vanadium compounds at elevated exhaust gas temperatures. Replacement of these vanadium-containing catalysts by vanadium-free catalysts, for example catalysts based on zeolite exchanged with transition metals such as iron or copper, does not seem to be suitable due to the known low ageing stability of these catalysts.

It is therefore an object of the present invention is to provide a process for the reduction of the nitrogen oxides present in a lean exhaust gas by selective catalytic reduction, using ammonia, on a reduction catalyst which does not have any, or a substantially reduced as compared with the prior art, emission of vanadium compounds at high exhaust gas temperatures and which is characterized by an outstanding activity and long-term stability of the SCR catalyst.

SUMMARY OF THE INVENTION

The above and other objects of the invention can be achieved by a process for selective catalytic reduction using ammonia, wherein some of the nitrogen monoxide present in the exhaust gas is oxidized to nitrogen dioxide before the exhaust gas, together with ammonia, is passed over a reduction catalyst. It is a feature of the process of the invention that the reduction catalyst contains a zeolite exchanged with transition metals and oxidation of the nitrogen monoxide is performed in such a way that the exhaust gas contains 30 to 70 vol. % of nitrogen dioxide before contact with the reduction catalyst.

According to the invention, a $V_2O_5/WO_3/TiO_2$ catalyst is not used. Rather, a zeolite catalyst exchanged with specific transition metals is used. Preferred transition metals are chromium, iron, nickel, copper, cerium, praseodymium, terbium or mixtures thereof. Vanadium may also be used as an exchange component because it is substantially more firmly bonded in the lattice of a zeolite catalyst than is the case with a $V_2O_5/WO_3/TiO_2$ catalyst. Preferably, however, vanadium is avoided altogether as an exchange element.

It has been shown that an increase in the nitrogen dioxide content in the exhaust gas greatly improves the activity of the reduction catalysts mentioned and also decreases ageing of the catalysts. In addition, nitrogen dioxide also increases in particular the activity of the catalysts at low temperatures. It is suspected that this positive effect of nitrogen dioxide is based on the fact that, for example, the divalent copper ions in the catalyst are reduced to monovalent copper ions due to selective catalytic reduction, which means that their catalytic activity is reduced. As a result of the oxidative components present in the exhaust gas, such as oxygen and nitrogen dioxide, the copper ions are reoxidized to divalent copper ions and thus recover their original activity. Nitrogen dioxide acts in a particularly advantageous manner here due to its relatively high oxidizing capacity. This reaction principle applies to all SCR-active transition metal ions which permit this type of valency change. This includes the ions of vanadium, chromium, iron, nickel, copper, cerium, praseodymium and terbium. Ions of iron, copper and cerium are particularly suitable.

Zeolites which are suitable for use in the invention are, for example, zeolites from the group ZSM-5, A, beta, X, Y, ferrierite, Linde type L and faujasite. These zeolites may also be used as a mixture.

A ZSM-5 zeolite exchanged with iron and/or copper is particularly preferably used as a catalyst. It has a high selectivity to give nitrogen. Secondary products of the SCR reaction such as laughing gas ($N_2O$) occur to only a small extent when using a Fe-ZSM-5 catalyst.

To form nitrogen dioxide or to increase the amount of nitrogen dioxide in the exhaust gas from an engine, an oxidation catalyst may be inserted upstream of the actual SCR catalyst. In particular when using Fe-ZSM-5, high conversion rates can then be produced in the SCR reaction, even after ageing. In addition to oxidation catalysts, other nitrogen dioxide producing devices, such as electrical gas discharges, may also be used.

Complete conversion of the nitrogen monoxide to nitrogen dioxide on the oxidation catalyst is not desirable and can be avoided by appropriate loading and/or sizing of the oxidation catalyst as compared with the reduction catalyst. A platinum catalyst on a support material comprising active, optionally stabilized, aluminum oxide can be used, for example, as the oxidation catalyst. The concentration of platinum on the support material may be between 0.1 and 5 wt. %, with respect to the total weight of catalyst. The catalyst is applied to a carrier which can be a conventional honeycomb structure in the form of a coating. The coating concentration may be chosen to be between 50 and 200 g/l of honeycomb structure in order to ensure that the exhaust gas downstream of the oxidation catalyst contains about 30 to 70 vol. % of nitrogen dioxide. Further adjustment to the required production of nitrogen dioxide is possible via the volume of the honeycomb structure used. Such oxidation catalysts are well known in the art.

In addition, the object of the oxidation catalyst is to convert the carbon monoxide, and in particular the hydrocarbons, present in the exhaust gas as completely as possible to carbon dioxide and water since, otherwise, the hydrocarbons would be stored by the subsequent zeolite catalyst. This would be associated with the risk of coking and deactivation of the zeolite catalyst.

Suitable oxidation catalysts for use in the process according to the invention are those which contain platinum, as the catalytically active component, on a high surface area support oxide, preferably γ-aluminum oxide. An aluminum oxide stabilized with about 5 wt. % of silicon dioxide is particularly beneficial.

The ammonia required for selective catalytic reduction can be added directly to the exhaust gas before contact with the reduction catalyst. Preferably, however, the ammonia is obtained on board the vehicle from a compound which can be hydrolyzed to give ammonia. For this purpose, the hydrolyzable compound is added to the exhaust gas after partial oxidation of the nitrogen monoxide and before contact with the reduction catalyst and then the exhaust gas is passed over a hydrolysis catalyst. Urea or ammonium carbamate are suitable for use as hydrolyzable compounds.

The SCR catalyst required for the process is a zeolite catalyst exchanged with the metal ions mentioned. A variety of ion exchange processes may be used to prepare this catalyst (solid exchange, exchange in aqueous solution, exchange in polar or non-polar organic solution). However, the preparation of Fe-ZSM-5 has proven to be especially difficult. Conventional exchange processes in aqueous solution have all proved to be useless because iron(III) compounds can barely penetrate into the pores of a zeolite due to the large hydration shell and this makes exchange in acid solution very difficult. Exchange in ammoniacal solutions has also proven unsuitable because iron hydroxide is then formed and precipitates out.

Exchange using aqueous solutions of iron(II) salts generally leads in the first place to the oxidation of iron(II) to iron(III), which can be circumvented, however, by appropriate pretreatment of the solvent with inert gases such as e.g. nitrogen or argon. Apart from iron(II) sulfate and iron(II) chloride, however, only sparingly soluble iron salts are available. When using salts with low solubility, the ion exchange takes place only slowly.

The simplest and best method has turned out to be solid ion exchange of zeolites with Fe(II) and Fe(III) chloride. The amount of iron salt required for complete exchange is blended with the zeolite to give a homogeneous powder. The mixture is then heated in a stream of nitrogen to the point where ion exchange can take place. The hydrochloric acid formed is discharged with the stream of nitrogen. From experience, ion exchange is complete after about 2 hours at a temperature of 300° C. The exchanged zeolite is then washed with water and dried at 120° C. Then the mixture may again be held at a constant temperature of 300° C. for 2 hours in nitrogen.

The final zeolite catalyst is preferably applied, in the form of a coating, to honeycomb structures made of ceramic or metal. For this purpose, the catalyst powder is suspended in water together with zirconyl nitrate as binder. The intended honeycomb structure can be coated with the resulting coating suspension in a known manner. A coating concentration of up to 200 grams of catalyst powder per liter of honeycomb structure is preferably striven for. After the coating procedure, the honeycomb structure is calcined, for example for a period of 4 hours at about 300° C., in order to fix the catalyst powder to the honeycomb structure and to transform the zirconyl nitrate into zirconium oxide. A preferred catalyst contains 1 to 10 wt. % of zirconium oxide, with respect to the total weight of coating.

BRIEF DESCRIPTION OF DRAWINGS

The present invention will be further understood with reference to the accompanying drawings, wherein.

DETAILED DESCRIPTION OF THE INVENTION

Figure 1:
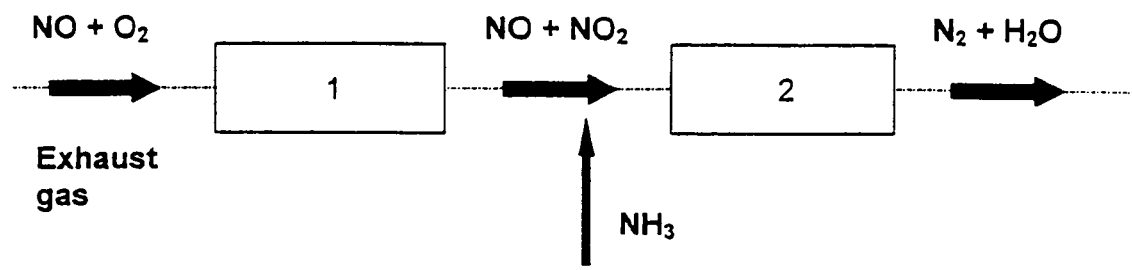
FIG. 1 is a schematic layout of an exhaust gas treatment system for performing the process of the invention with direct addition of ammonia to the exhaust gas.

FIG. 1 shows the schematic layout of an exhaust gas treatment system suitable for use in the process according to the invention. It consists of an oxidation catalyst (1) and a downstream reduction catalyst (2). The exhaust gas arising from the internal combustion engine which contains, inter alia, nitrogen monoxide and oxygen enters the oxidation catalyst (1). Some of the nitrogen monoxide is oxidized to nitrogen dioxide in the oxidation catalyst (1) so that a mixture of nitrogen monoxide and nitrogen dioxide emerges from the oxidation catalyst. Ammonia, as a reducing agent, is added to this gas mixture in the molar ratio NH$_3$/NO$_x$ of 0.6 to 1.6 before entrance to the reduction catalyst (2). This gas mixture is converted to nitrogen and water in the reduction catalyst (2). The molar ratio NH$_3$/NO$_x$ is also called the alpha value ($\alpha$) in the following.

Figure 2:
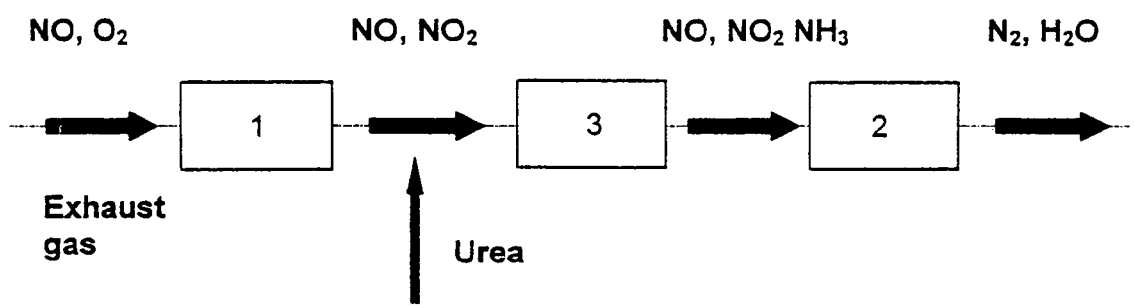
FIG. 2 is a schematic layout of an exhaust gas treatment system for performing the process of the invention with production of ammonia by hydrolysis of an ammonia releasing compound.

FIG. 2 shows a variant of the exhaust gas treatment system in FIG. 1. Instead of ammonia, a compound which can decompose to give ammonia such as, for example, urea, is added to the exhaust gas downstream of the oxidation catalyst (1). To release the ammonia, a urea hydrolysis catalyst (3) which decomposes the urea to ammonia, carbon dioxide and water is located in the exhaust gas stream upstream of the reduction catalyst (2).

Producing Reduction Catalysts:

Fe-ZSM5 catalysts were prepared as follows for use in the process according to the invention: zeolite H-ZSM5 with a modulus of 40 (the modulus of a zeolite is the molar ratio SiO$_2$/Al$_2$O$_3$.) was carefully blended with FeCl$_3$ and then held at a constant temperature of 300° C. for a period of 2 hours in a stream of nitrogen. The amount of FeCl$_3$ was measured in such a way that complete exchange of the zeolite took place, in accordance with its exchange capacity. The exchanged zeolite was then washed with water and dried at 120° C. and then again treated at 300° C. for a period of 2 hours under nitrogen.

The catalyst powder obtained in this way had an iron concentration of 1.7 wt. %, with respect to the total weight of powder. The powder was dispersed in water, together with zirconyl nitrate as binder, and used to coat a conventional honeycomb structure made of cordierite which had a cell density of 62 cm$^{-2}$. The coating was calcined for a period of 4 hours at 300° C. in air. The final coating contained 196 g/l of catalyst powder and 6 g/l of zirconium oxide.

EXAMPLE

Drilled cores of these catalysts with a diameter of 2.54 cm and a length of 7.62 cm were subjected to the following synthesis gas mixture at a space velocity of 30000 h$^{-1}$ to test them in the process according to the invention:
- 500 Vol. ppm nitrogen oxides in the ratio NO:NO$_2$ of 1:1; 3:1 and 1:3
- 450 Vol. ppm ammonia
- 5 Vol. % oxygen
- 1.3 Vol. % water vapour
- Remainder, nitrogen The temperature of the synthesis gas was increased in steps from 150 to 525° C. For each temperature step, the gas composition was analysed downstream of the reduction catalyst.

Figure 3:
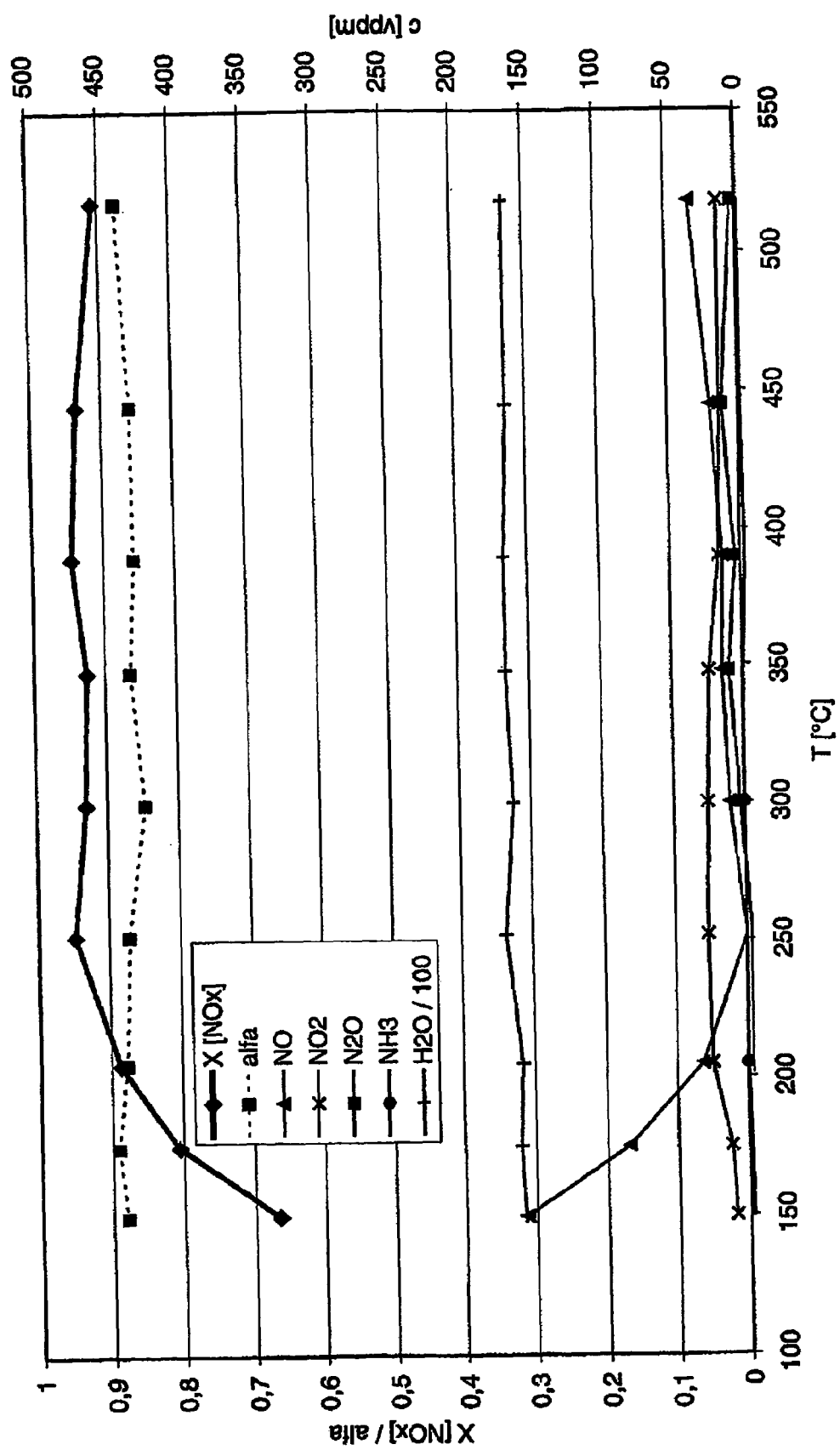
FIG. 3 is a graph representing the plot of degree of conversion of nitrogen oxide, X, as a function of the exhaust gas temperature for a freshly prepared Fe-ZSM5 catalyst with a space velocity of 30000 $h^{-1}$ and a $NO/NO_2$ volume ratio of 1:1.

FIG. 3 gives the results for a freshly prepared catalyst. The volume ratio NO/NO$_2$ in this case was 1:1.

Figure 4:
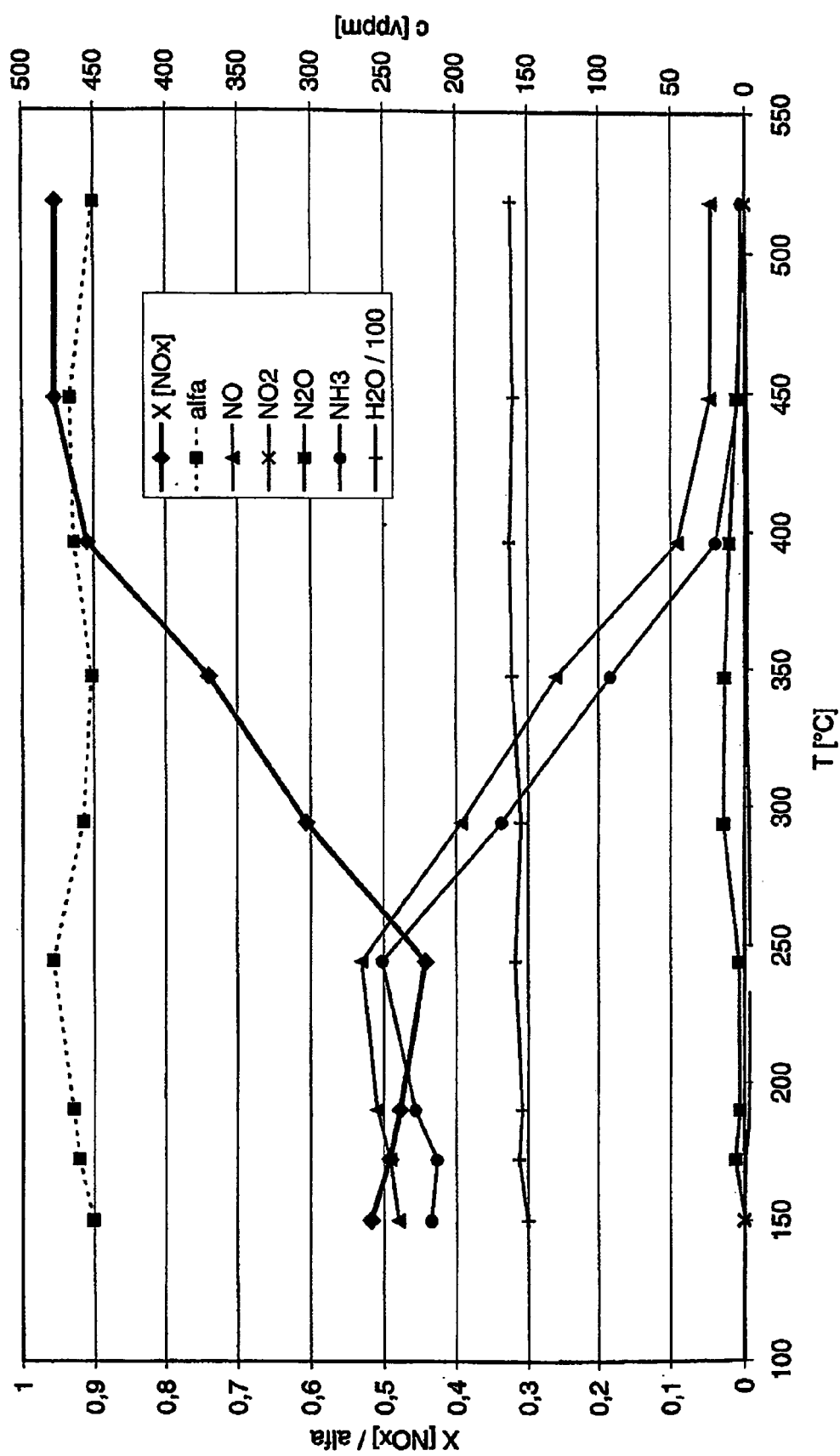
FIG. 4 is a graph representing the plot of degree of conversion of nitrogen oxide, X, as a function of exhaust gas temperature for an aged Fe-ZSM5 catalyst with a space velocity of 30000 $h^{-1}$ and a $NO/NO_2$ volume ratio of 3:1.
Figure 5:
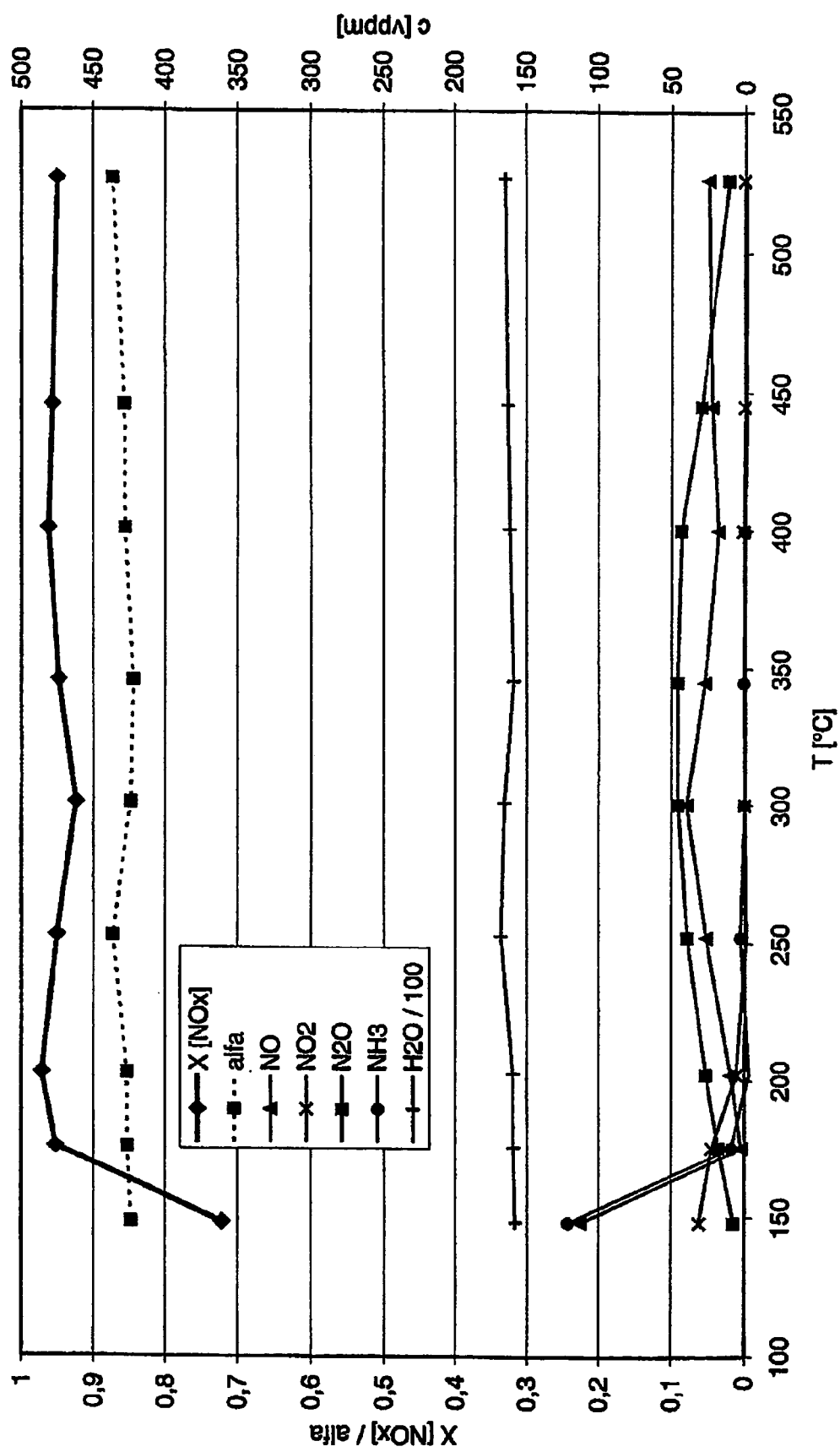
FIG. 5 is a graph representing the plot of degree of conversion of nitrogen oxide, X, as a function of exhaust gas temperature for an aged Fe-ZSM5 catalyst with a space velocity of 30000 h$^{-1}$ and a NO/NO$_2$ volume ratio of 1:1.
Figure 6:
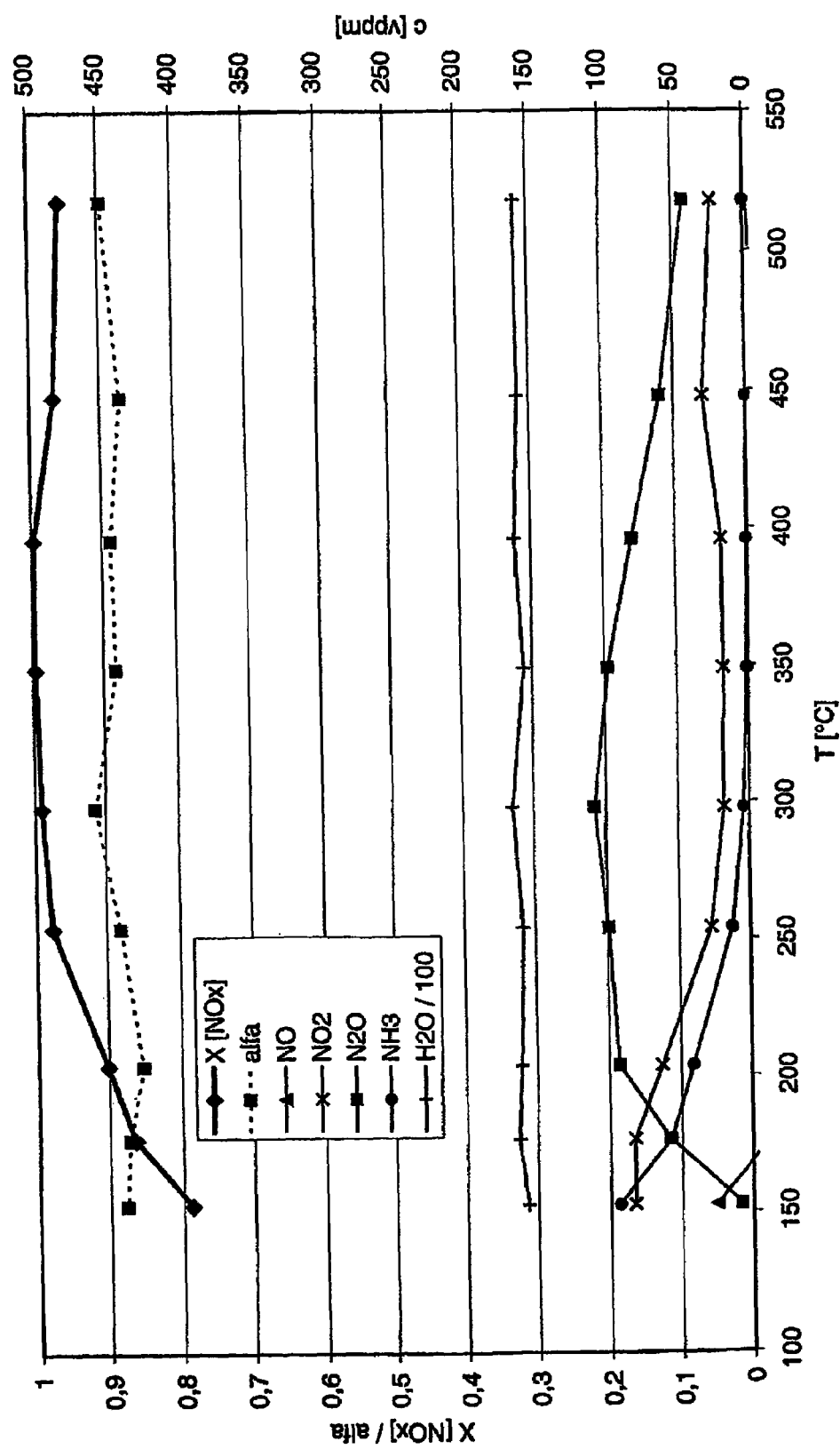
FIG. 6 is a graph representing the plot of degree of conversion of nitrogen oxide, X, as a function of exhaust gas temperature for an aged Fe-ZSM5 catalyst with a space velocity of 30000 h$^{-1}$ and a NO/NO$_2$ volume ratio of 1:3.

FIGS. 4 to 6 show the experimental results for aged catalysts. To age the catalysts, they were stored for a period of 48 hours under hydrothermal conditions at a temperature of 650° C.

FIG. 4 shows the results for a volume ratio NO/NO$_2$ of 3:1, FIG. 5 for a volume ratio NO/NO$_2$ of 1:1 and FIG. 6 for a volume ratio NO/NO$_2$ of 1:3. As can be seen from these measurements, the aged catalyst has a better low temperature activity (between 150 and 250° C.) than the fresh catalyst, with a volume ratio NO/NO$_2$ of 1:1. A value of about 1:1 represents an optimum value for the volume ratio NO/NO$_2$ with regard to the variation in catalytic activity and selectivity of the conversion to nitrogen.

The volume ratio required can be adjusted by an oxidation catalyst inserted in the exhaust gas stream upstream of the reduction catalyst (FIGS. 1 and 2).

Figure 7:
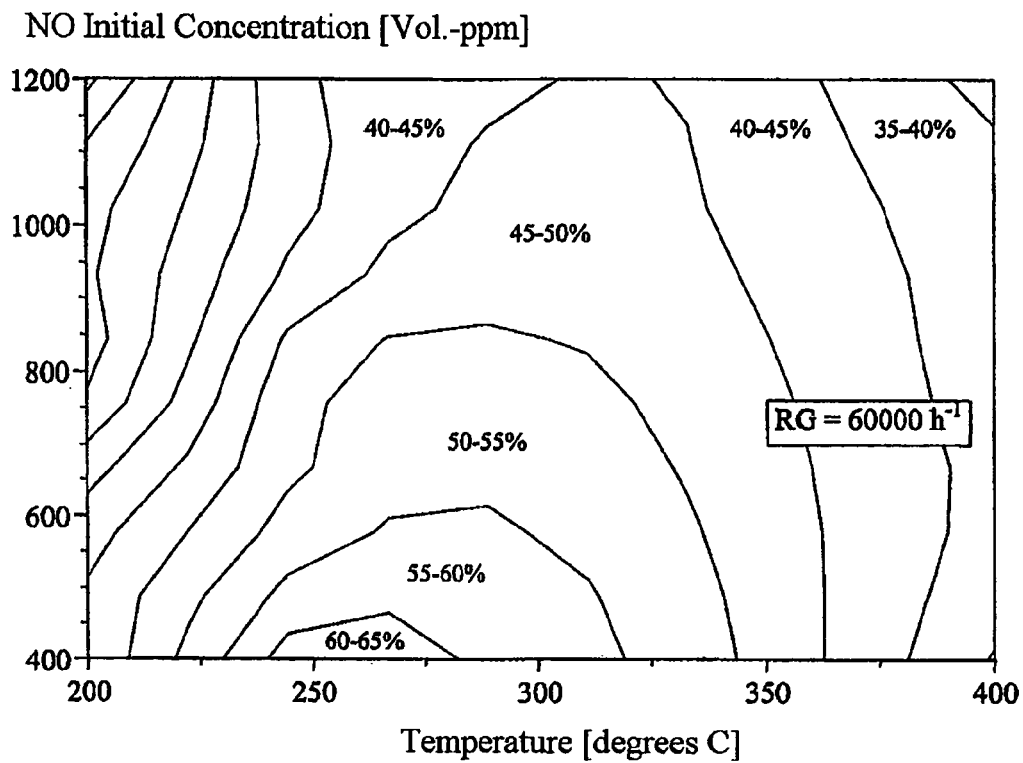
FIG. 7 is a graphical representation of NO$_2$ concentration in the exhaust gas after the oxidation catalyst with a space velocity of 60000 h$^{-1}$ and different exhaust gas temperatures.
Figure 8:
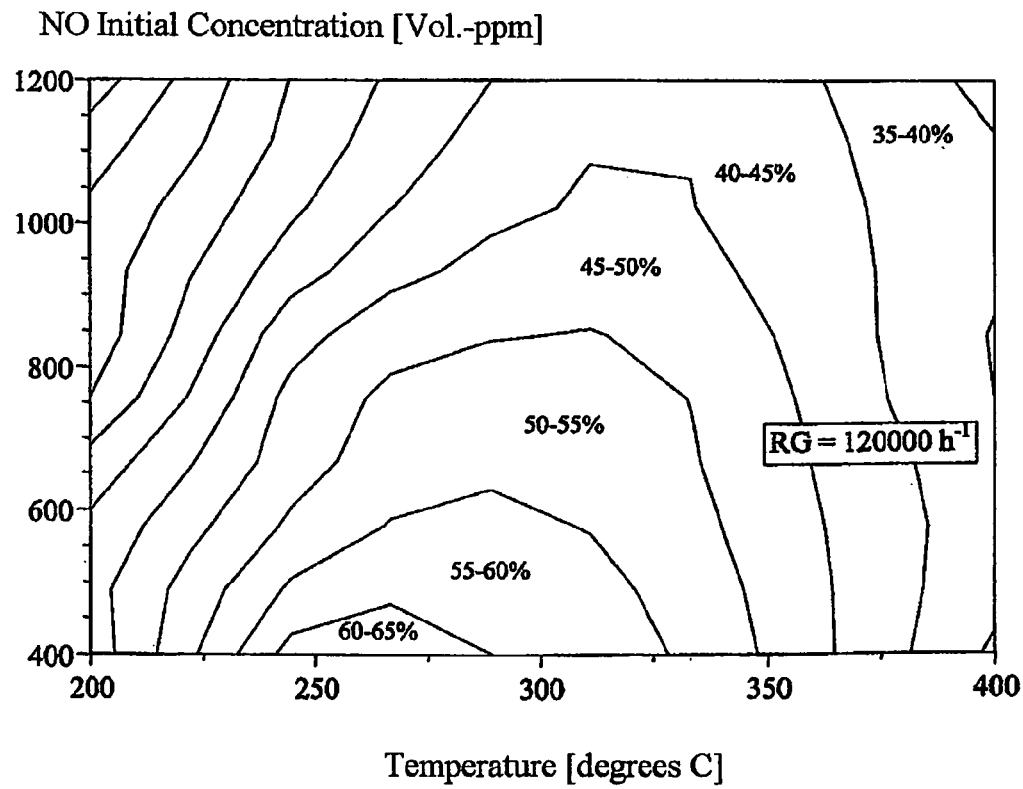
FIG. 8 is a graphical representation of NO$_2$ concentration in the exhaust gas after the oxidation catalyst with a space velocity of 120000 h$^{-1}$ and different exhaust gas temperatures.
Figure 9:
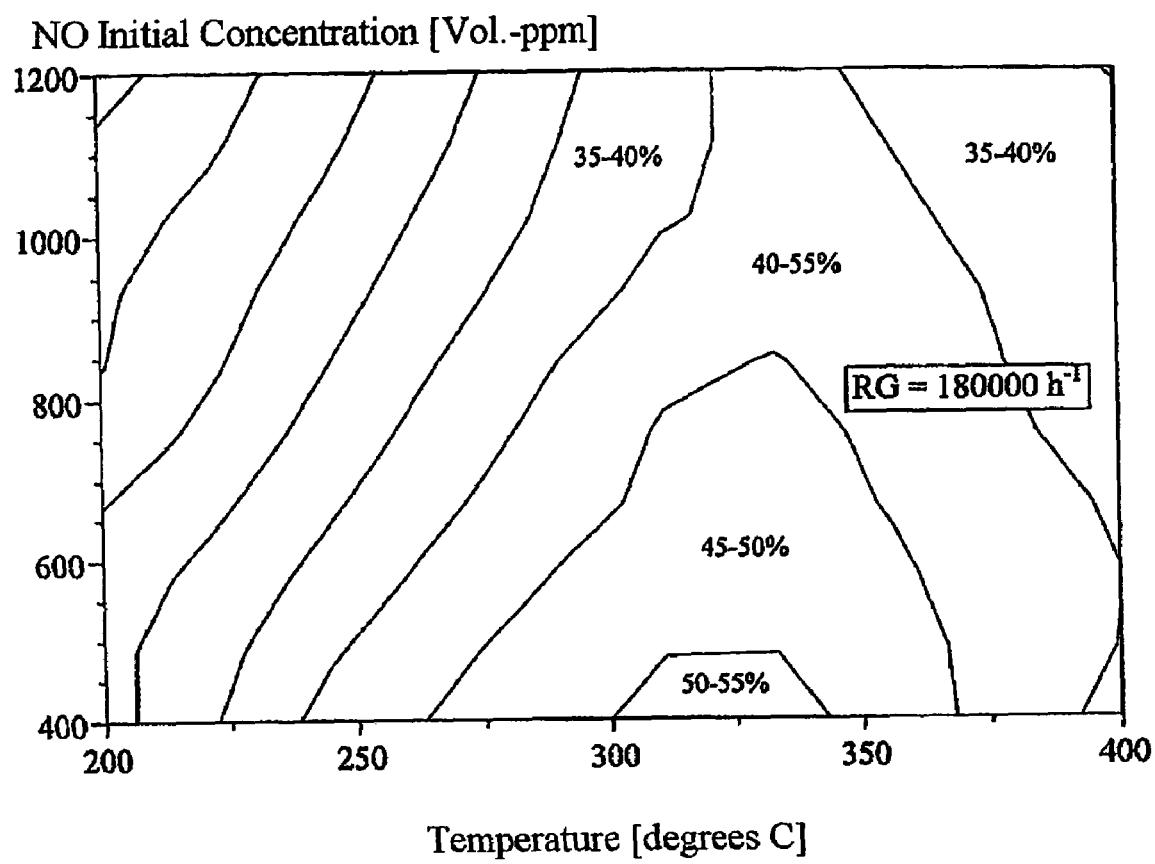
FIG. 9 is a graphical representation of NO$_2$ concentration in the exhaust gas after the oxidation catalyst with a space velocity of 180000 h$^{-1}$ and different exhaust gas temperatures.

FIGS. 7 to 9 show measurements of nitrogen dioxide concentration downstream of a platinum oxidation catalyst when contacting with a synthesis gas mixture of the following composition:
- 500 Vol. ppm nitrogen monoxide NO
- 5 Vol. % oxygen
- 1.3 Vol. % water vapour
- Remainder, nitrogen The platinum catalyst was applied at a concentration of 120 g/l to a honeycomb structure made of cordierite with a cell density of 62 cm$^{-2}$. The platinum content of the catalyst was 3.2 g Pt per liter of honeycomb structure.

The figures show that the required NO/NO$_2$ volume ratio can be maintained over a wide range of space velocities SV between 60000 and 180000 h$^{-1}$. It has to be taken into account that the exhaust gas temperature from an engine increases with increasing space velocity, that is with increasing engine load.

Further variations and modifications of the foregoing will be apparent to those skilled in the art and are intended to be encompassed by the claims appended hereto.

German priority application 100 20 100.8 is relied on and incorporated herein by reference.

We claim:

1. A process for reducing nitrogen oxides present in a lean exhaust gas from an internal combustion engine by selective catalytic reduction on a reduction catalyst using ammonia, comprising oxidizing in the absence of an electrical gas discharge some of the nitrogen monoxide present in the exhaust gas to nitrogen dioxide so that the nitrogen oxides present in the exhaust gas contain 30 to 70 vol. % of nitrogen dioxides before contact with the reduction catalyst, wherein oxidation of the nitrogen monoxide present in the exhaust gas takes place in the presence of an oxidation catalyst, passing the exhaust gas, together with ammonia, over said reduction catalyst, wherein the reduction catalyst comprises a zeolite exchanged with a transition metal.

2. The process according to claim 1, wherein the transition metal is a member selected from the group consisting of vanadium, chromium, iron, nickel, copper, cerium, praseodymium, terbium and mixtures thereof.

3. The process according to claim 2, wherein the reduction catalyst comprises a zeolite exchanged with a member selected from the group consisting of iron, copper, cerium or mixtures thereof.

4. The process according to claim 3, wherein the reduction catalyst comprises at least one zeolite selected from the group consisting of ZSM-5, A, beta, X, Y, ferrierite, Linde type L and faujasite.

5. The process according to claim 4, wherein the reduction catalyst comprises a ZSM-5 zeolite exchanged with at least one of iron and copper.

6. The process according to claim 1, wherein the oxidation catalyst comprises platinum on an active, optionally stabilized, aluminum oxide.

7. The process according to claim 1, wherein the oxidation catalyst is deposited on a honeycomb carrier.

8. The process according to claim 1, wherein the ammonia required for selective catalytic reduction is obtained from a compound which can be hydrolyzed to give ammonia.

9. The process according to claim 8, further comprising adding said hydrolyzable compound to the exhaust gas after partial oxidation of the nitrogen monoxide and before contact with the reduction catalyst and then passing the exhaust gas over a hydrolysis catalyst.

10. The process according to claim 8, wherein said compound which can be hydrolyzed to give ammonia is urea or ammonium carbamate.

* * * * *